(12) United States Patent
Meitinger et al.

(10) Patent No.: US 10,773,604 B2
(45) Date of Patent: Sep. 15, 2020

(54) METHOD FOR OPERATING AN ENERGY STORAGE DEVICE IN A MOTOR VEHICLE, AND MOTOR VEHICLE

(71) Applicant: AUDI AG, Ingolstadt (DE)

(72) Inventors: Karl-Heinz Meitinger, Munich (DE); Michael Wein, Seubersdorf (DE); Martin Schüssler, Kösching (DE); Alois Stauber, Ingolstadt (DE); Reinhard Hofmann, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 103 days.

(21) Appl. No.: 15/521,423

(22) PCT Filed: Oct. 23, 2015

(86) PCT No.: PCT/EP2015/074579
§ 371 (c)(1),
(2) Date: Apr. 24, 2017

(87) PCT Pub. No.: WO2016/062850
PCT Pub. Date: Apr. 28, 2016

(65) Prior Publication Data
US 2017/0305289 A1    Oct. 26, 2017

(30) Foreign Application Priority Data

Oct. 24, 2014  (DE) .................. 10 2014 015 802
Nov. 11, 2014  (DE) .................. 10 2014 016 620

(51) Int. Cl.
*H02J 7/00*        (2006.01)
*B60L 53/62*       (2019.01)
(Continued)

(52) U.S. Cl.
CPC ........... *B60L 53/62* (2019.02); *B60L 11/1838* (2013.01); *B60L 58/19* (2019.02); *H01M 10/441* (2013.01); *Y02T 10/7005* (2013.01); *Y02T 10/705* (2013.01)

(58) Field of Classification Search
USPC .................................. 320/103, 104
See application file for complete search history.

(56) References Cited

U.S. PATENT DOCUMENTS 8,368,347 B2 *  2/2013  Mitsutani .............. B60K 6/445
                                                    320/104
8,368,354 B2 *  2/2013  Endo ..................... B60K 6/365
                                                    320/109
(Continued)

FOREIGN PATENT DOCUMENTS

CN    102457083 A     5/2012
CN    103119825 A     5/2013
(Continued)

OTHER PUBLICATIONS

International Search Report and Written Opinion dated Feb. 11, 2016 of corresponding application No. PCT/EP2015/074579; 12 pgs.

(Continued)

*Primary Examiner* — Samuel Berhanu
(74) *Attorney, Agent, or Firm* — Maier & Maier, PLLC

(57) ABSTRACT

A method for operating an energy storage device with at least one first and at least one second energy storage element in a motor vehicle, wherein the first and the second energy storage elements are connected in series to provide a nominal voltage of the energy storage device, wherein when a charging condition indicated for charging an energy storage device by a motor vehicle-independent energy source as fulfilled, the first and the second energy storage elements are connected in parallel to the motor vehicle-independent (Continued)

energy source, wherein a charging voltage is provided by the motor vehicle-independent energy source for charging the energy storage device, which is lower than the nominal voltage of the energy storage device with a connection in series of the first and of the second energy storage element.

10 Claims, 4 Drawing Sheets

(51) Int. Cl.
*B60L 58/19* (2019.01)
*B60L 11/18* (2006.01)
*H01M 10/44* (2006.01)

(56) References Cited

U.S. PATENT DOCUMENTS

| | | | | |
|---|---|---|---|---|
| 8,571,733 | B2* | 10/2013 | Yamamoto | B60L 3/0046 701/22 |
| 8,648,565 | B2* | 2/2014 | Mitsutani | B60K 6/445 320/109 |
| 8,659,182 | B2* | 2/2014 | Ichikawa | B60L 11/1861 307/10.1 |
| 9,007,001 | B2* | 4/2015 | Sugiyama | B60L 11/14 307/9.1 |
| 9,013,138 | B2* | 4/2015 | Nomura | H02J 7/044 320/104 |
| 9,024,586 | B2 | 5/2015 | Vance et al. | |
| 9,764,650 | B2 | 9/2017 | Böhm et al. | |
| 2007/0052295 | A1* | 3/2007 | Frucht | H02J 7/0024 307/66 |
| 2007/0139012 | A1* | 6/2007 | Hayashigawa | B60L 58/19 320/128 |
| 2009/0079384 | A1 | 3/2009 | Harris | |
| 2012/0119701 | A1 | 5/2012 | Igata | |
| 2012/0133310 | A1* | 5/2012 | Lee | B60L 3/04 318/139 |
| 2013/0038270 | A1* | 2/2013 | Endo | H02J 7/0019 320/103 |
| 2014/0203759 | A1* | 7/2014 | Sugiyama | B60L 1/003 320/104 |
| 2014/0292261 | A1 | 10/2014 | Wang et al. | |

FOREIGN PATENT DOCUMENTS

| | | |
|---|---|---|
| DE | 102010041253 A1 | 3/2012 |
| DE | 102012007906 A1 | 10/2013 |
| JP | 2013038910 A | 2/2013 |
| JP | 2013081316 A | 5/2013 |
| WO | 2012/063385 A1 | 5/2012 |

OTHER PUBLICATIONS

German Office Action dated Jul. 21, 2015 of corresponding application No. 10 2014 016 620.1; 6 pgs.

Translation of the International Preliminary Report on Patentability dated May 4, 2017, in connection with corresponding PCT Application No. PCT/EP2015/074579 (8 pgs.).

Office Action dated Oct. 9, 2018 in corresponding Chinese Application No. 201580057737.X; 19 pages including machine-generated English-language translation and Appendix.

* cited by examiner

METHOD FOR OPERATING AN ENERGY STORAGE DEVICE IN A MOTOR VEHICLE, AND MOTOR VEHICLE

BACKGROUND

The invention relates to a method for operating an energy storage device, which is provided with at least a first and at least a second energy storage device element in a motor vehicle, wherein the first and the second energy storage element are connected in series in order to provide nominal voltage.

Batteries are used in motor vehicles to operate a variety of motor vehicle systems. Increasingly, rechargeable energy storage devices are used also to operate the drive systems of motor vehicles, for example in hybrid or pure electric vehicles. In this case, in many of these types of motor vehicles, a battery is charged from the power grid to enable a purely electrical operation of the drives. In order to drive these batteries, direct current chargers are in particular used, which provide direct current to charge the battery with a predetermined voltage. The voltage can be typically be varied within a predetermined range so as to charge the vehicle batteries with different nominal voltages, or the charging voltage can be also varied during the charging operation to enable the fastest possible and/or the most gentle possible battery charging operation.

For vehicles with a high electrical output it may be advantageous to use in the electrical system of the vehicle relatively high voltages, in particular for a traction system of the vehicle, for example voltages of up to 800 Volts to achieve a high efficiency of the drive components, as well as to reduce the line diameter in the electrical system of the vehicle and thus to reduce the weight of the vehicle. At the same time, however, it should be also possible to charge the energy storage device which provides this voltage with direct current charging devices that are commonly used in order to provide for the user many charging options for his motor vehicle. The maximum nominal voltage for an energy storage device of a motor vehicle is thus limited by the usual maximum voltage that is typically provided by charging columns. For example, the maximum charging voltage in the charging columns is limited according to CHAdeMo standard to 500 V. Another standard for charging columns, the CCS standards, permits voltages up to 1,000 V. However, many charging columns according to the CCS standard are also limited to 500 V.

In order to allow charging of energy storage devices of a motor vehicle with as many charging columns as possible, it is therefore necessary to use with the currently available charging infrastructure a nominal voltage of the energy storage device of less than 500 V.

The object of the invention is therefore to specify a method for operating an energy storage device by means of which higher voltages can be provided in an electrical system of a vehicle, wherein at the same time, the charging can be conducted with a plurality of motor vehicle-independent energy sources.

SUMMARY OF THE DISCLOSURE

The objective is achieved according to the invention with a method of the type mentioned in the introduction by means of a switching device while fulfilling the requirements for provided for charging the energy storage device with a vehicle-independent energy source indicating the charging condition, wherein the first and the second energy storage elements are connected in parallel to a vehicle-independent energy source, and wherein a charging voltage is provided by the vehicle-independent energy source for charging the energy storage device, which is lower than the nominal voltage of the energy storage device when the first and of the second energy storage elements are connected in series.

According to the invention, when the charging condition is not fulfilled, which is to say in particular during the driving operation of the motor vehicle, the first and the second energy storage element are connected in series, and when the charging condition is fulfilled, which is to say in particular during a charging operation, the first and the second energy storage elements are connected in parallel. By connecting the first and the second energy storage element in series, the power grid electrical system of the vehicle can function without high voltages. This is because although the charging condition is fulfilled, since the first and the second energy storage elements are connected in parallel, the drop of the voltage in the energy storage elements is reduced, which makes it possible to charge the energy storage element with a low charging voltage. Motor vehicle-independent charging voltages can thus be used to charge the energy storage device because only a charging voltage is provided that is lower than the nominal voltage of the energy storage device with connection in series of the energy storage elements.

An energy storage device using the method according to the invention can comprise a plurality of battery cells, which are connected in part in parallel and in part in series. For example, the energy storage device can have a nominal voltage of 720 V and it can be formed by connecting in series 200 cells, each with 3.6 V of nominal voltage, so that two such parallel cell strings are used connected in series. If a motor vehicle-independent energy source can provide for example a maximum charging voltage of 500 V, then it is possible to reconfigure the energy storage device in such a manner that 100 cells are now connected in series and four of the cell strings connected in parallel are used. Therefore, the nominal voltage in the energy storage device will be reduced to 360 V during charging. so that charging can be conducted with a charging voltage below 500 V.

The fact that energy is being supplied by means of the motor vehicle-independent source can be communicated to the motor vehicle with a user input of the user, for example with a switch or with a menu-controlled operating system. However, it is advantageous when the fact that energy is being provided is detected automatically. In this case, the charging condition of the charging device can be determined as a function of a connection of a charging connection device of the motor vehicle to the vehicle-independent energy source. The connection of the charging connection device to the motor-vehicle side energy source, which is to supplying of the energy, can be activated for example with a mechanical switch provided at the charging connection device, which is activated when it is connected to the motor vehicle-side energy source, or it can be detected with a control device that detects for example voltage being applied to the charging connection device.

Alternatively or additionally, the charging condition can be evaluated by using radio communication for motor vehicle-independent energy sources. For example, an RFID chip can be provided on the motor vehicle-independent energy source that can recognize a detection device of the motor vehicle, so that it can be detected that a motor vehicle is located in the vicinity of an independent energy source. An evaluation of radio signal, or optical markings or the like are particularly advantageous when the charging of the motor vehicle battery is to take place in contactless manner. In particular with contactless charging, the charging condition can be used to evaluate additionally also the switching state of the ignition or the like.

The fulfilling of the charging condition can be additionally also determined as a function of a maximum voltage that can be provided with the motor vehicle-independent energy source. With a plurality of charging systems, the motor vehicle-independent energy source communicates before and/or during the charging operation with a control device of the motor vehicle. The maximum charging voltage that can be made available can thus be provided within the context of this communication.

A parallel connection of energy storage elements and thus a lowering of the nominal voltage is particularly suitable when the nominal voltage of the energy storage element is higher during the connection in series of the at least the first and the second energy storage element than the maximum charging voltage, which means that charging can be enabled only with a parallel connection.

In addition, it is also possible that two different connection of the energy storage elements may be provided with an operation of an energy storage device that has more than two energy storage elements, at least two different connections of the energy storage elements, wherein at least one first and one second energy storage element are connected in parallel so that the type of the connection is determined as a function of the maximum provided charging voltage. In the example described above, 200 cells are connected in series and 2 of these cell strings are connected in parallel with the normal driving operation so that in addition to the connection described above, 100 cells are connected in series and four of these strings are connected in parallel, wherein if a voltage drop is provided in a further stage wherein, 50 cells are connected in series and 8 of these cell strings are connected in parallel. The nominal voltage of the energy storage device can be reduced in this case to 180 V, while the charging condition is fulfilled.

The charging connection device can be advantageously separated from the energy storage device when the charging condition is not fulfilled. In this case, both the phase and the ground can be separated. What is achieved by separating the charging connection device from the energy storage device and in particular from the entire power grid electrical system of the motor vehicle is that the charging connection device will not be under voltage outside of the charging operation, which means that complicated contact protection can be avoided in this manner.

When the charging conditions is met, it can also be advantageous when at least one user being supplied by the energy storage device during the driving operation of the vehicle is separated from the energy storage device. In particular, both the phase as well as the ground can be separated. It is in addition also advantageous when the user is separated from the energy storage device when the charging condition is fulfilled. The voltage provided is lowered with the fulfillment of the parallel connection condition of the energy storage element. The energy storage device then cannot make available a sufficient voltage for the user operation. In order to prevent a malfunction of the user as a result of a low voltage and/or to prevent discharging of the energy storage device by the users, it is advantageous when the energy storage device is separated from them.

As a motor vehicle-independent energy source can be used a direct current charging device providing direct current for charging the energy storage device. In this case, a maximum charging voltage that can be made available to the motor vehicle can be communicated, in particular before and/or during the charging operation by means of the direct current charging device, wherein the fulfilling of the charging condition is detected as a function of the maximum available charging voltage. In addition or alternatively, the motor vehicle can communicate the momentary voltage to the direct current charging device. In this context, the highest voltage attainable for the energy storage element with a corresponding connection is communicated first to the direct current charging device. If a signal is sent back that the corresponding voltage cannot be provided, the next lower voltage achievable with a connection of the energy storage element can be transmitted, when at least parts of the energy storage element are connected in parallel.

In particular, if upon detecting a connection of a charging connection device of the motor vehicle to the motor vehicle-independent source, the maximum available charging storage is larger than a predetermined voltage threshold value, the first and the second energy storage element are or remain connected in series and a charging operation of the energy storage device can be started. The voltage limiting value can be higher than or equal to the nominal storage of the energy storage element with a connection in series of the first and of the second energy storage element. In particular, the voltage limiting value may correspond to the sum of the nominal voltage and a predetermined offset, wherein the offset corresponds to a voltage that must be higher than the nominal voltage during the state when the charging process is used in order to charge the energy storage device up to its nominal voltage. If the maximum available charging voltage is greater than the predetermined voltage value, the switching device will in particular not switch on the energy storage element, so that switching of the energy storage element to the charging operation corresponds to the switching operation during the driving operation of the motor vehicle.

A direct current charging device whose maximum available charging voltage is lower than the nominal voltage of the energy storage device can be advantageously used when the first and the second energy storage elements are connected in series. Direct current charging devices, which provide relatively small maximum charging voltages, can be also used with the lowering the nominal voltage of the energy storage device when a charging conditions is fulfilled.

In addition, the invention also relates to a motor vehicle having an energy storage device for providing energy to at least one consumer, wherein the energy storage device comprises at least a first and a second energy storage element and wherein the motor vehicle is configured to carry out the method according to the invention.

The motor vehicle according to the invention can be in particular a purely electric vehicle, or a hybrid vehicle, in particular a socket hybrid.

The energy storage device advantageously comprises a first group of multiple energy storage elements and a second group of multiple energy storage elements, wherein the energy storage elements in respective groups are connected in parallel and/or in part in series and/or partially in parallel, wherein each group is provided with a first and with a second connection point by means of which current is supplied to and/or removed from the energy storage element of each respective group and between which the group voltage falls. In this case, each group can comprise for example two strings of battery cells connected in parallel, each with 100 battery cells connected in series per string.

The first and the second group, as well as in particular other groups, can be in this case arranged together in one housing. However, it is also possible to provide a separate housing for each of the groups and/or to arrange the groups so that they are spatially separated in different regions of a motor vehicle.

The switching device can be configured to connect when the charging condition is not fulfilled the first connection point of the first group to the second connection point of the second group, and when the charging condition is fulfilled, to connect the first connection point of the first group with the first connection point of the second group and the second connection point of the first group to the second connection point of the second group. At the same time, the first connection point can have in each case a positive pole and the second connection point can have in each case a negative pole, or vice versa. A parallel connection of the groups is achieved by connecting both the first connection points and the second connection points, and by connecting the first connection point of the first group to the second connection point of the second group, so that a connection in series of the groups is created.

Alternatively, it is also possible that the energy storage device comprises at least two other energy storage elements, wherein the switching device is configured to connect when the charging condition is not fulfilled at least one of the other energy storage elements in series with the first group and at least one of the energy storage element in series with the second group, and when the charging condition is fulfilled, to connect the other energy storage element in parallel with the first and with the second group, so that the first and second group are connected in parallel. The other energy storage elements can be in particular connected in series when the charging conditions are fulfilled. In this case, the other energy storage elements form another group of energy storage elements which are connected when the charging condition is fulfilled in parallel to the first and to the second group of energy storage elements, which, however, will be distributed to other group when the charging condition is not fulfilled.

For example, it can be provided that the first and the second group each comprises 100 energy storage elements connected in series and the third group comprises 100 other energy storage elements that are connected when the charging condition is fulfilled in series to each other and in parallel to the first and to the second group. If the charging condition is not fulfilled, in particular during the normal driving operation, only 50 of the other energy storage element can be connected in series to the first group and 50 of the other energy storage element can be connect in series to the second group, so that the energy storage device comprises two parallel strings of energy storage elements, each with 150 energy storage elements. The nominal voltage of the energy storage device when the charging condition is fulfilled would thus be smaller by a factor of 1.5 than when the charging condition is not fulfilled.

The motor vehicle can comprise in particular a control device designed to detect as charging information a connection of the first charging connection device of the motor vehicle to the motor vehicle-independent energy source, and in particular a maximum charging voltage of the motor vehicle-independent energy source, and to control the changeover device depending on the charging information.

BRIEF DESCRIPTION OF THE DRAWING

Further advantages and details of the invention will become evident from the following embodiments as well as from the attached figures, which indicate the following.

DETAILED DESCRIPTION OF THE DRAWING

Figure 1:
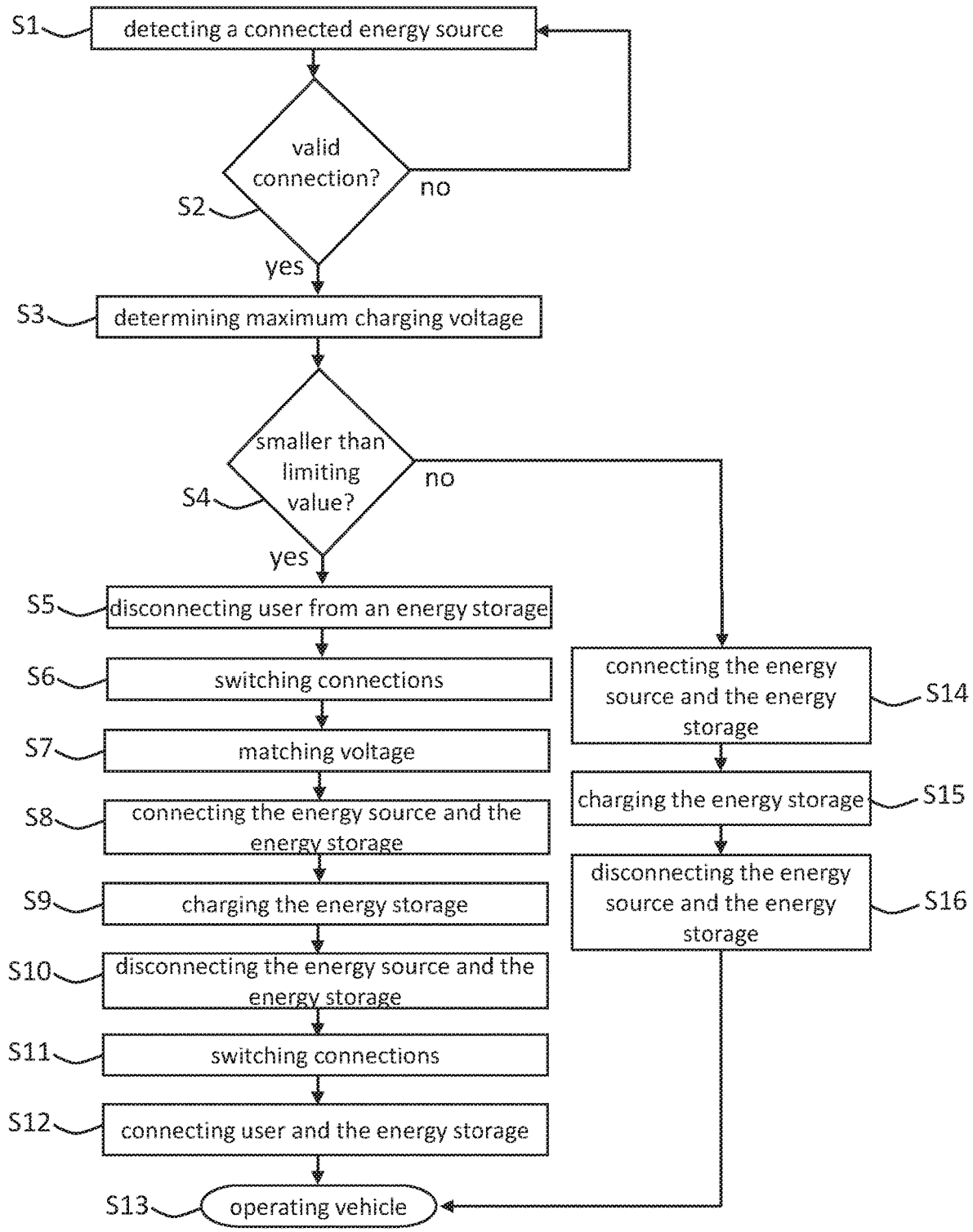
FIG. 1 shows schematically a flowchart of an embodiment of the method according to the invention.

FIG. 1 shows a schematic view of a flowchart explaining a method for operating an energy storage device in a motor vehicle. The motor vehicle comprises in this case at least one first energy storage element and at least one second energy storage element. In order to provide a nominal voltage of the energy storage device, the first and the second energy storage elements are connected in series. For example, the motor vehicle can include 200 first energy storage elements which are divided into two strings, each having 100 energy storage elements connected in parallel, and 200 second energy storage elements, also connected in parallel. The first energy storage elements can in this case be considered to be the first group and the second energy storage elements can be considered to be the second group, wherein the first group and the second group are connected in series.

In order to enable charging of the motor vehicle also with motor vehicle-independent energy sources whose maximum voltage available for charging is smaller than the nominal voltage of the energy storage device with a connection in series between the first and the second energy storage elements or between the first and the second group, when the charging condition is fulfilled, the first and the second energy storage elements or the first and the second group are connected in parallel so as to reduce the voltage of the energy storage device and thus also the required charging voltage.

Figure 2:
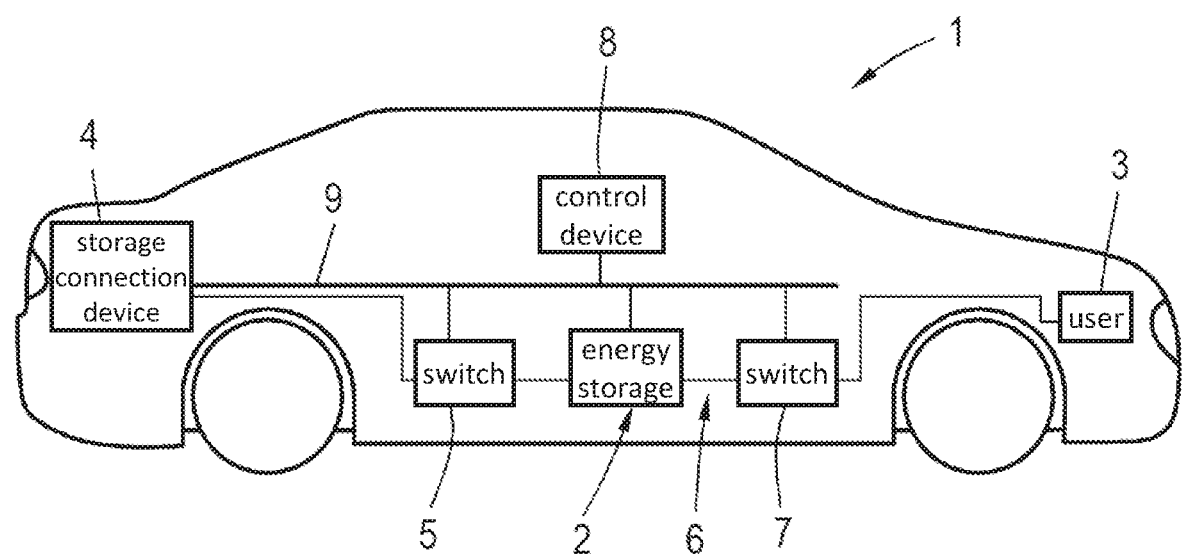
FIG. 2 shows schematically an embodiment of a motor vehicle according to the invention.
Figure 3:
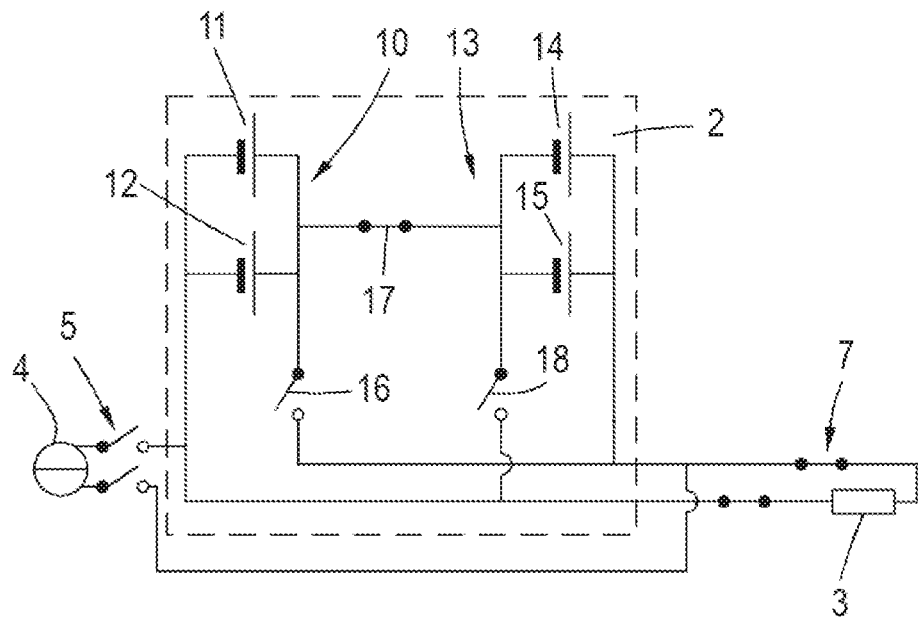
FIG. 3 shows schematically a detailed view of an energy storage device of the motor vehicle illustrated in FIG. 2 when the charging condition is not fulfilled.
Figure 4:
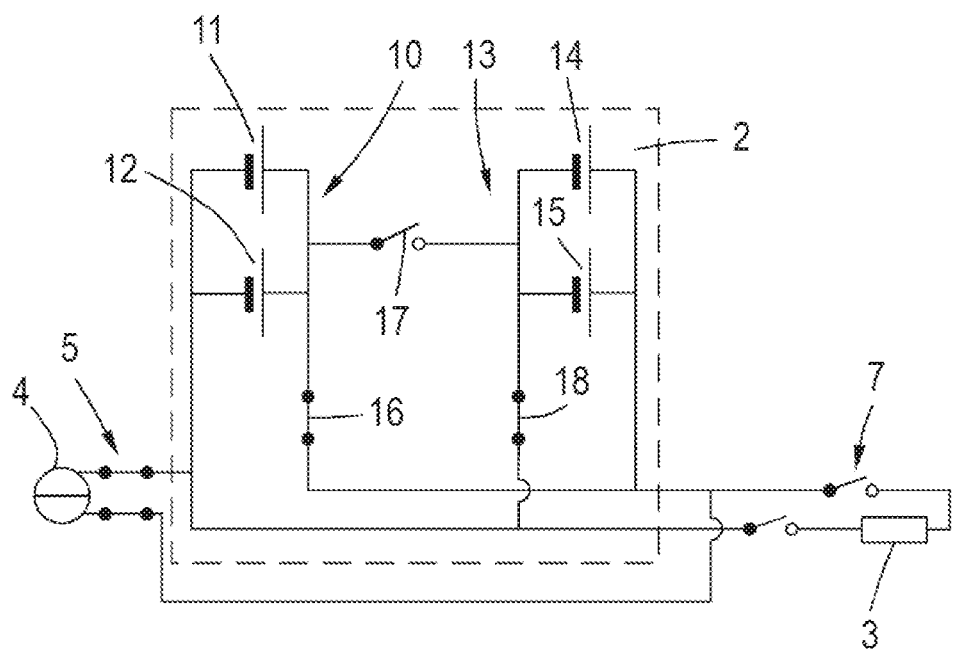
FIG. 4 shows schematically a detailed view when the charging condition is fulfilled.

The method will next be described with reference to FIGS. 2, 3 and 4, wherein FIG. 2 shows a motor vehicle 1 that is designed for carrying out the method of FIG. 1, and FIGS. 2 and 3 respectively show a detailed view of the energy storage device 2 of the motor vehicle 1. FIG. 3 shows the state of the energy storage element 2 during the normal driving operation when a charging condition is not fulfilled, and FIG. 4 shows the state of the energy storage element 2 during the charging of the motor vehicle with a motor vehicle-independent energy source when the charging condition is fulfilled.

In step S1 it is detected whether a motor vehicle-independent energy source is connected to the charging connection device 4. For this purpose, the charging connection device comprises a sensor, not shown in the figure, in particular a switch that detects when a charging cable is plugged in. The state of the sensor is detected by the control device 9 via a motor vehicle bus 9.

In step S2, the control device 8 verifies whether the detected state of the sensor indicates a connection of the motor vehicle-independent source to the storage connection device 4. If this is not the case, the procedures is repeated from step S1, which is to say that the control device waits until a charging cable is connected to the charging connection device 4.

When a connection of the charging connection device 4 to a motor vehicle-independent source is determined in step S2, the control device 8 indicates in step S3 the maximum voltage available for charging from the motor vehicle-independent source, which is a direct current device. For this purpose, a charging cable is provided as well as an additional line in the charging connection device 4 for communication between the control device 8 and the motor vehicle-independent energy source. As an alternative, it would be also possible to communicate with the motor vehicle-independent energy source by using a wireless connection.

In step S4 it is verified whether the maximum available charging voltage determined in step S3 is smaller than a limiting value that is stored in the control device 8. The limiting value in this case corresponds to the sum of a nominal voltage of the energy storage device during a connection in series of the first and second energy storage element, or of the first and second group, and of an additional offset. The offset is selected in such a way that when charging process is selected, the charging of the energy storage device is enabled up to the nominal voltage that corresponds to the limiting value.

In the motor vehicle 1, the energy storage device 2 comprises, as shown in FIG. 3 and FIG. 4, a first group 10 and a second group 13 of energy storage elements. The first group 10 is illustrated here in a simplified manner as a parallel connection of two energy storage element 11, 12.

In a real battery, a plurality of energy storage elements that are connected in series are typically used instead of the energy storage elements 11, 12 shown in the figure. The representation of each energy storage element 11, 12 is used to achieve better clarity. Both first energy storage elements 11, 12 provide a voltage of 360 V and they can be formed in a real battery for example with 100 respective battery cells and with a voltage of 3.6 V for each cell connected in series. Accordingly, the second group 13 is designed with and comprises the second energy storage elements 14, 15 to which the same description is applicable as what was said about the first energy element group 11, 12. During the driving operation, the first group 10 and the second group 13 are connected in series, so that the nominal voltage of the energy storage device 2 is 720 V. As was already mentioned, the limiting value corresponds to the sum of this nominal voltage and an additional offset. The limiting value can be for example 760 V.

If it has been determined in step S4 that the motor vehicle-independent source can provide only a maximum charging voltage that is smaller than the limiting value, for example 500 V, then the user 3, which is an electromotor, will be disconnected from the energy storage device 2 along with other potential users, not shown in the figure. The disconnection is carried out by controlling the switch 7 with a control device 8. Accordingly, the switch 7 is shown in FIG. 7 in the closed state, while the switch 7 is shown in the opened state in FIG. 4. The result of disconnecting the user 3 from the energy storage device 2 is that with the next lowering of the voltage of the energy storage device 2, this lowered voltage will not be applied to the user. This will also prevent a discharge of the energy storage device and an operation of this user with a voltage that does not match.

After that, the first and the second energy storage elements or the first and the second group of the energy storage elements are connected in parallel in step S6. For this purpose, the control device 8 controls the switches 16, 17 and 18 of the energy storage device 2. The position of the switches 16, 17, 18 before the switching is shown in FIG. 3 and the position after the switching is shown in FIG. 4. A first connection point of the first group 10 is connected to the first connection point of the second group 13 by means of the switch 16, the first connection point of the first group 10 is connected to a second connection point of the second group 13 by means of the switch 17, and a second connection point of the first group 10 is connected to the second connection point of the second group 13 by means of the switch 18. The first connection points of the group 10, 13 represent in each case the positive poles of each group 10, 13, and the second connection points represent the negative poles of the group 10, 13.

During the driving operation, which is to say when the charging condition is not fulfilled, the switches 16, 18 are open and the switch 17 is closed, so that the first group 10 and the second group are connected and the first energy storage elements 11, 12 are thus connected in series to the second energy storage elements 14, 15.

After the switching in step S6, the switches 16, 17 are closed and the switch 17 is open as shown in FIG. 4. Therefore, the first group 10 is connected in parallel to the second group 13, so that the first energy storage elements 11, 12 are connected in parallel to the second energy storage elements 14, 15. The nominal voltage of the energy storage device 2 is therefore reduced by a factor of 2, which is to say 360 V.

In step S7, the charging voltage provided by the energy source is matched with the communication of the control device 8 with the motor vehicle-side energy source, so that after that, the charging connection 4 is connected with the energy storage device 2 in step S8, wherein the switch 5 is closed. In step S9, the charging of the energy storage device 2 by the motor vehicle-side energy source is carried out. After the end or with an interruption of the charging, the charging device is disconnected from the energy storage device 2 by opening the switch 5 in step S10, so that after that, with a suitable control of the switches 16, 17, 18 by the control device 8 in step S11, the first group 10 and the second group 13 of the energy storage elements in the energy storage device 2 are again connected in series. The nominal voltage of the energy storage device is again increased to 720 V. After that, the user 3 is connected again in step S12 to the energy storage device 2 by closing the switch 7. The motor vehicle 1 is then operated again with a driving operation in step S13 and it can be operated normally.

If it is determined in step S4 that the maximum available charging voltage is greater than the predetermined limiting value, the charging of the energy storage device will take place without connecting at least one first and at least one second energy storage element 11, 12, 14, 15, or without connecting the first and the second group 10, 13 in parallel. The charging therefore takes place with a nominal voltage of the energy storage device 2 of 720 V. For this purpose, the charging connection device is connected by means of the switch 5 to the energy storage device 2 in step S14 as was described in connection with step S8, and the charging of the battery then takes place in step S15, and in step S16, the charging connection device 4 is disconnected again from the energy storage device 2 by opening the switch 5. The procedure is then concluded in this case also with the step S13.

Figure 5:
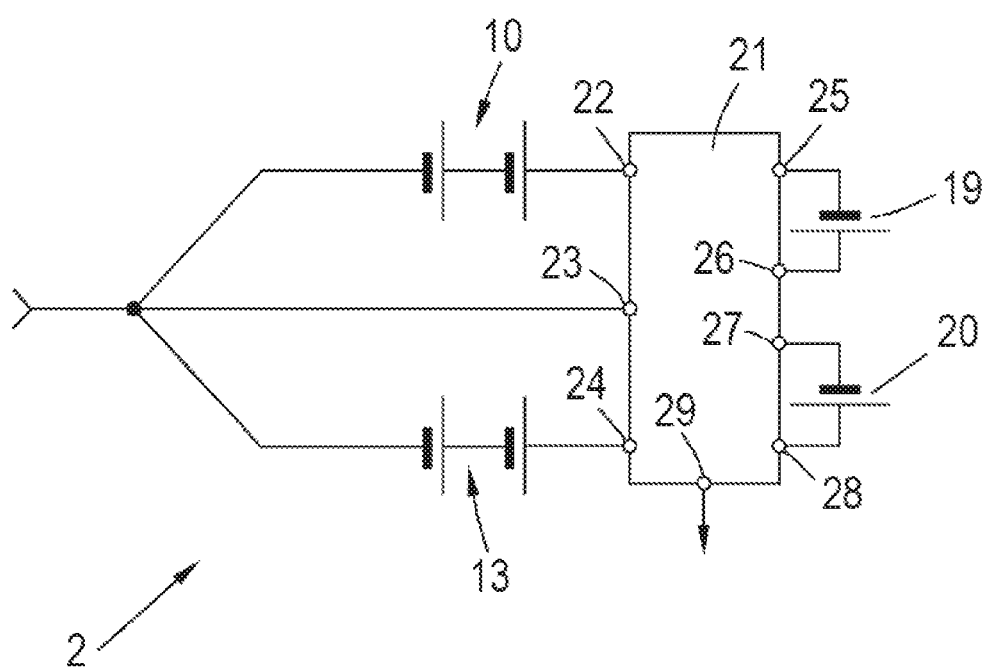
FIG. 5 shows schematically a detailed view of an energy storage device in another embodiment of a motor vehicle according to the invention.

FIG. 5 shows an energy storage device of another embodiment of a motor vehicle. The energy storage device 2 comprises a first group 10 and a second group 13 of energy storage elements, as well as two other energy storage elements 19, 20. The switching device 21 is controlled with a control device, not shown in the figure, in such a way that that the connections 22, 23, 24, 25, 26, 27, 28, 29 of the switching device 21 will be connected or separated depending on the fulfilling of the charging condition. If the charging condition is fulfilled, the connections 22, 24 and 28 are connected to the connection 29, the connection 23 is connected to the connection 25 and the connection 26 is connected to the connection 27. Therefore, the connection 23 is connected via the other energy storage elements 19, 20 that are connected in series to the connection 29, and the other energy storage elements 19, 20 are thus connected in parallel to the first group 10 and to the second group 13. On the other hand, if the charging condition is not fulfilled, the control device, not shown in the figure, controls the switching device in such a way that the connection 22 is connected with the connection 25 and the connection 26 is connected with the connection 29, so that the other energy storage element 19 is connected in series to the energy storage element of the first group 10. In addition, the connection 24 is connected with the connection 27 and the connection 28 is connected to the connection 29, so that the other energy storage element 20 is connected in series to the energy storage element of the second group 13. The connection 23 remains unconnected. In this case, the energy storage elements are connected in such a manner that each of the three energy storage elements is connected in series and two such strings are connected in parallel. Therefore, in the case when the charging condition is fulfilled, the voltage of the energy storage device is reduced by a factor of 1.5 when compared to the case when the charging condition is not fulfilled.

The invention claimed is:

1. A method for operating an energy storage device comprising:
    a first and a second group of a plurality of energy storage elements in a motor vehicle; and
    a supplemental group of a plurality of energy storage elements in the motor vehicle, the supplemental group includes first supplemental energy storage elements and second supplemental energy storage elements,
    wherein the first and the second group are connected in series to provide a nominal voltage of the energy storage device,
    wherein when availability for charging is indicated by a switching device for providing energy for charging the energy storage device with a motor vehicle-independent energy source, the first and the second group are connected in parallel with the motor vehicle-independent energy source,
    wherein a charging voltage is provided for charging the energy storage device with the motor vehicle-independent energy source that is lower than the nominal voltage of the energy storage device with a connection in series of the first and of the second group,
    wherein the first and the second group are connected in series for supplying power and in parallel for charging,
    wherein the switching device is designed to connect when the charging condition is not fulfilled of the first supplemental energy storage elements in series to the first group and the second supplemental energy storage elements in series to the second group, and when the charging condition is fulfilled, to connect the supplemental group of the energy storage elements in parallel to the first and to the second group, wherein the first and the second group are connected in parallel,
    wherein the first supplemental energy storage elements and the second supplemental energy storage elements are connected to the first and second groups in series or in parallel, and
    wherein when the charging condition is not fulfilled, the energy storage device includes two parallel strings:
        the first group and the first supplemental energy storage elements in series; and
        the second group and the second supplemental energy storage elements in series.

2. The method according to claim 1, wherein the fulfilling of the charging condition is determined as a function of a connection of a charging connection device of the motor vehicle to the motor vehicle-independent energy source.

3. The method according to claim 2, wherein the charging connection device is disconnected from the energy storage device when the charging condition is not fulfilled.

4. The method according to claim 1, wherein when the charging condition is fulfilled, at least one consumer, which is supplied during the driving operation of the motor vehicle by the energy supply device, is disconnected from the energy storage device.

5. The method according to claim 1, wherein as a motor vehicle-independent energy source is used a direct current device, which provides direct current for charging the energy storage device.

6. The method according to claim 5, wherein before or during the charging operation, the maximum charging voltage provided by the direct current charging device is communicated by the direct current charging device to the motor vehicle, wherein the maximum charging voltage provided is determined depending on whether the charging condition is fulfilled.

7. The method according to claim 6, wherein when a connection is determined between a charging connection device of the motor vehicle and the motor vehicle-independent energy source, if the maximum changing voltage provided is larger than a predetermined voltage value, the first and the second energy group are or remain connected in series and a charging operation of the energy storage device will be started.

8. A motor vehicle comprising:
    an energy storage device including a first group of a plurality of energy storage elements and a second group of a plurality of energy storage elements; and
    a supplemental group of a plurality of energy storage elements in the motor vehicle, the supplemental group includes first supplemental energy storage elements and second supplemental energy storage elements,
    wherein the energy storage elements are connected in each group in parallel and in series,
    wherein each group is provided with a first and with a second connection point, through which current is supplied to and removed from each group of the energy storage elements and between which a group voltage drops,
    wherein a switching device is designed to connect when the charging condition is not fulfilled the first supplemental energy storage elements in series to the first group and the second supplemental energy storage elements in series to the second group, and when the charging condition is fulfilled, to connect the supplemental group of the energy storage elements in parallel to the first and to the second group, wherein the first and the second group are connected in parallel,
        wherein the first supplemental energy storage elements and the second supplemental energy storage elements are connected to the first and second groups in series or in parallel, and
    wherein when the charging condition is not fulfilled, the energy storage device includes two parallel strings:

the first group and the first supplemental energy storage elements in series; and the second group and the second supplemental energy storage elements in series.

9. The motor vehicle according to claim 8, wherein the switching device is designed to connect when the charging condition is not fulfilled the first connection point of the first group to the second connection point of the second group, and when the charging condition is fulfilled, to connect the first connection point of the first group to the first connection point of the second group and the second connection point of the first group to the second connection point of the second group.

10. The motor vehicle according to claim 8, wherein the motor vehicle comprises a control device, which is designed to detect as charging information a connection between a charging connection device of the motor vehicle to the motor vehicle-independent energy source, and in particular a maximum charging voltage of the motor vehicle-independent energy source, and to control the switching device as a function of the charging information.

* * * * *